April 5, 1932.   E. RICARD   1,852,063
MANUFACTURE OF BUTYL CHLORIDES
Filed Dec. 26, 1922
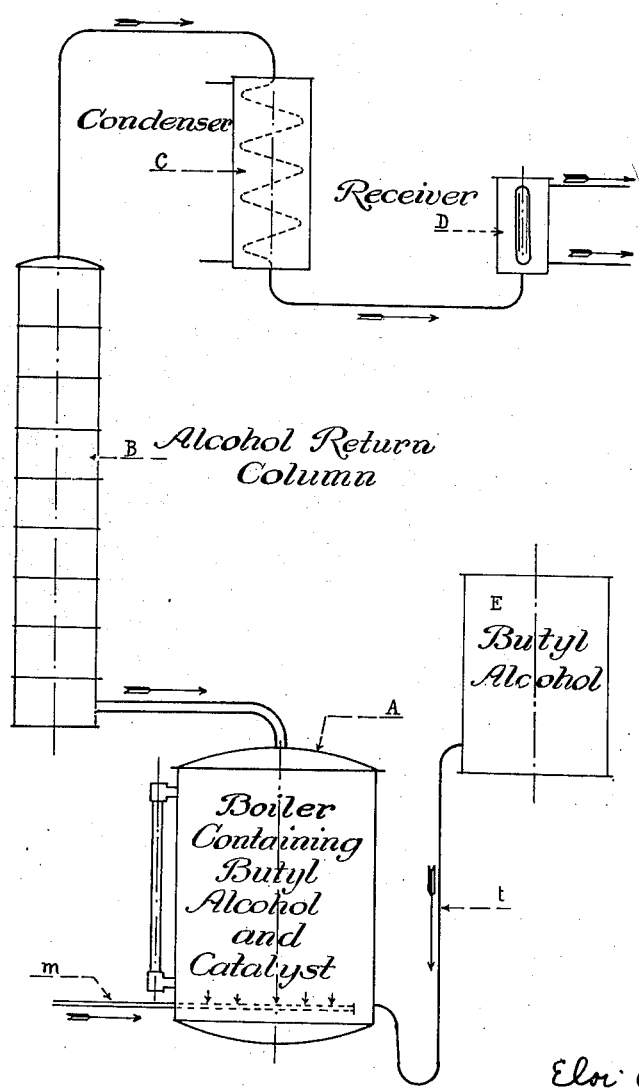
INVENTOR
Eloi Ricard
BY
Mauro, Cameron, Lewis + Kerkam,
ATTORNEYS Patented Apr. 5, 1932

1,852,063

UNITED STATES PATENT OFFICE

ELOI RICARD, OF MELLE, FRANCE, ASSIGNOR TO SOCIÉTÉ RICARD ALLENET & CIE., OF MELLE (DEUX-SÈVRES), FRANCE

MANUFACTURE OF BUTYL CHLORIDES

Application filed December 26, 1922, Serial No. 609,166, and in France December 28, 1921.

This invention relates to a continuous manufacture of butyl chlorides consisting in causing hydrogen chloride to act without pressure on hot butyl alcohol in presence of a suitable catalyst.

The vessel containing the butyl alcohol and the catalyst is heated to a suitable temperature; a continuous current of hydrogen chloride and butyl alcohol in the desired quantity is run in and there distil continuously the butyl chlorides formed together with the water produced by the reaction. Agitation facilitates the reaction and accelerates it but is not indispensable.

The considerable difference between the boiling points of the chlorides formed and the alcohol from which they have been produced permits easy separation of the chlorides while retaining the greater part of the butyl alcohol in the vessel.

As a secondary reaction there are formed butyl oxides in quantity which is unimportant and varies with the catalyst and the alcohol used; a part of these oxides distils with the chlorides and the water, the rest remaining in the vessel.

The butyl oxides thus formed do not diminish the yield or chlorides because they are themselves esterified by the hydrogen chloride in presence of the same catalysts as easily as are the butyl alcohols. The oxides which have been removed by distillation, therefore, can be returned to the manufacture.

Suitable catalysts are of three sorts:—

1. Catalysts which have a purely dehydrating action, like sodium sulphate, copper sulphate, magnesium chloride, magnesium sulphate, sulphuric acid, phosphoric acid, sodium bisulphate and the like.

2. Catalysts adapted to form combinations with hydrochloric acid more or less stable, or products of addition with hydrochloric acid, such as cuprous chloride, cupric chloride, mercuric chloride, ferrous chloride or bismuth chloride.

3. Catalysts which may be regarded as belonging to both the foregoing categories, such as zinc chloride or cadmium chloride.

These catalysts may be used singly or mixed with each other without distinction of category except that they must not be incompatible.

Whatever catalyst is used, the water which is set free begins to distil as soon as the reaction begins and continues to be eliminated regularly without interruption.

The accompanying drawing illustrates diagrammatically an arrangement of apparatus suitable for carrying out the present invention.

The following examples illustrate the procedure when apparatus indicated in the accompanying diagram is used.

*Example 1.*—500 kilos of normal butyl alcohol are charged into a boiler A; 250 kilos of cupric chloride are added and dissolved by heating, by means of steam or in any other manner, with aid of a double bottom or some other device; there is then introduced into the boiler a current of hydrogen chloride through the pipe m.

The acid is absorbed and after a short time butyl chlorides begin to distil. The butyl chloride vapours traverse a column B by means of which the butyl alcohol carried forward is returned to the boiler A. The operation is so controlled that the temperature of the vapours at the top of the column B is about 80°. Butyl alcohol is run regularly from the vessel E through the pipe t to make good the alcohol esterified. The operation can continue in this manner for several days without sensibly enfeebling the catalyst. The distillate condensed in the condenser C runs into the receiver D where it separates into two layers.

The upper layer consists almost entirely of butyl chlorides containing a little water, butyl alcohol and hydrochloric acid. At the same time there is present as an impurity a small quantity of butyl oxide.

This layer is dried and rectified, whereupon it yields normal butyl chloride containing a very small proportion of secondary butyl chloride.

The lower layer consists for the greater part of water containing in solution a little butyl alcohol, hydrochloric acid and butyl chlorides. It is treated with sodium carbonate or in any other manner to recover the butyl alcohol and the chlorides which it contains.

The yield is approximately that indicated by theory.

It will be understood that, in operating as above described (that is to say, by maintaining a temperature of 80° C. at the top of column B) the resulting distillate will contain in the upper layer thereof a binary azeotropic mixture of butyl chloride and water and in the lower layer a binary azeotropic mixture of butyl alcohol and water; and thereby the water is practically all eliminated, making the process a continuous one.

*Example 2.*—The boiler is charged with 500 kilos of isobutyl alcohol and there are added 100 kilos of cadmium oxide. The boiler is heated and the current of hydrogen chloride is passed in the manner described in Example 1.

The apparatus is controlled so as to maintain a temperature of about 70° C. at the top of the column; on rectification there is obtained isobutyl chloride.

What I claim is:—

1. The continuous manufacture of butyl chloride by the continuous action of hydrochloric acid upon butyl alcohol, which consists in heating the butyl alcohol, in adding a copper chloride thereto, in circulating hydrochloric acid through the butyl alcohol, and in distilling the butyl chloride at a temperature where the water will be eliminated as binary azeotropic mixtures respectively with said butyl chloride and the butyl alcohol.

2. The continuous manufacture of butyl chloride by the continuous action of hydrochloric acid upon butyl alcohol; which consists in heating the butyl alcohol, in adding a copper chloride thereto, in circulating hydrochloric acid through the butyl alcohol, in distilling the butyl chloride at a temperature where the water will be eliminated as binary azeotropic mixtures respectively with said butyl chloride and the butyl alcohol, in condensing the distilled product which separates into two layers whereof one contains the major part of the butyl chloride and the other the major part of the water, which is eliminated, and in the continuous addition of butyl alcohol and hydrochloric acid to replace the part thereof which was converted into chloride.

3. The continuous manufacture of butyl chloride by the continuous action of hydrochloric acid upon butyl alcohol, which consists in heating the butyl alcohol, in adding a metallic chloride thereto as catalyst, and in circulating the butyl chloride at a temperature where the whole of the water forms in the reaction azeotropic mixtures respectively with said butyl chloride and the butyl alcohol.

In testimony whereof I have signed this specification.

ELOI RICARD. [L. S.]